(12) United States Patent  (10) Patent No.: US 8,195,192 B2
Chow et al.  (45) Date of Patent: Jun. 5, 2012

(54) PERSONAL TRACKING DEVICE WITH LOW POWER CONSUMPTION

(75) Inventors: Hoi Lam Martin Chow, Hong Kong (CN); Ching Ching Jenny Chung, Hong Kong, CA (US); Kam Yuk Claudia Lai, Hong Kong (CN); Hor Yau Carrie Lee, Hong Kong (CN); Kam Wah Ma, Hong Kong (CN); Ping See Diana Mak, Hong Kong (CN); Ping Kong Alexander Wai, Hong Kong (CN); Fuk Tat Arthur Mak, Hong Kong (CN); Jia Jane You, Hong Kong (CN); Kai Yu Tong, Hong Kong (CN); Yongping Zheng, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 380 days.

(21) Appl. No.: 12/414,672

(22) Filed: Mar. 31, 2009

(65) Prior Publication Data

US 2010/0069087 A1  Mar. 18, 2010

Related U.S. Application Data

(60) Provisional application No. 61/064,846, filed on Mar. 31, 2008.

(51) Int. Cl.
*H04W 24/00* (2009.01)
(52) U.S. Cl. ............... 455/456.1; 455/456.3; 455/456.6; 455/403; 455/404.2; 342/357.55; 340/7.5

(58) Field of Classification Search .................. None
See application file for complete search history.

(56) References Cited

U.S. PATENT DOCUMENTS

| 6,121,922 A * | 9/2000 | Mohan ...................... 342/357.75 |
| 6,700,533 B1 * | 3/2004 | Werb et al. ................ 342/357.48 |
| 6,828,908 B2 * | 12/2004 | Clark ........................ 340/539.13 |
| 2006/0041380 A1 * | 2/2006 | Motoyama et al. ........... 701/213 |
| 2006/0238347 A1 * | 10/2006 | Parkinson et al. ......... 340/572.4 |
| 2008/0055154 A1 * | 3/2008 | Martucci et al. ........... 342/357.1 |
| 2009/0203410 A1 * | 8/2009 | Lu ................................. 455/574 |
| 2009/0224966 A1 * | 9/2009 | Boling et al. ............. 342/357.1 |
| 2009/0285142 A1 * | 11/2009 | Zhang et al. .................. 370/311 |

* cited by examiner

*Primary Examiner* — Ajit Patel
(74) *Attorney, Agent, or Firm* — George Wang Wilkinson & Grist

(57) ABSTRACT

An portable tracking device integrating a mobile phone module (e.g. based on GSM or 3G networks), a GPS module, a radio Beacon and ultrasonic beacon. The tracking device is normally in a hibernated state when the entire device consumes little energy and require no periodically changing or recharging batteries to power the device. It consumes power from the primary battery only when a tracking process is actually taken place. With this portable tracking device on the person who is unable to affirmatively report his or her whereabout, the remote center and/or a search team can communicate the GPS module, radio beacon and ultrasonic beacon of the tracking device via the mobile phone module based on existing wireless communication technologies, such SMS, GPRS, ect, on GSM or 3 G networks, which also serves as a means of initial rough estimation of the tracking device's location.

14 Claims, 1 Drawing Sheet

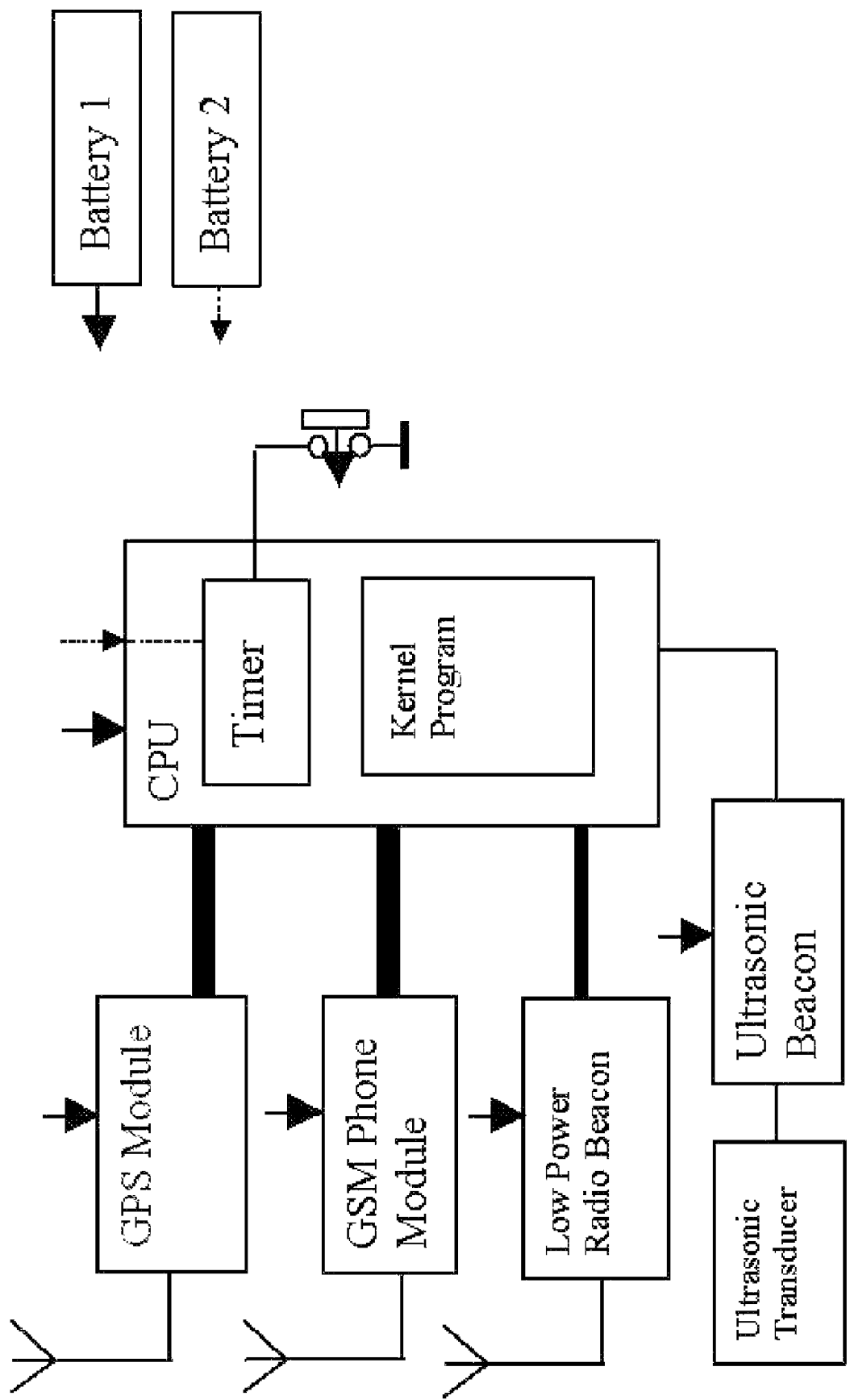

PERSONAL TRACKING DEVICE WITH LOW POWER CONSUMPTION

CROSS REFERENCE TO RELATED APPLICATIONS

This application claims benefit from U.S. Provisional Application No. 61/064,846, filed on Mar. 31, 2008, the content of which is hereby incorporated by reference in its entirety.

FILED OF THE INVENTION

This invention relates to a wearable self-contained tracking device. Particularly, it relates to a wearable self-contained tracing device that does not require periodically charging the batteries and thus suitable for people suffering from senile dementia.

BACKGROUND OF THE INVENTION

With the problem of population aging, an increasing number of people are suffering from senile dementia (such as those associated with Alzheimer's disease, vascular dementia, Parkinson's disease, Lewy body disease, etc). They have the history of gone missing or eloping from their homes. General speaking, these patients usually do not have any immediate danger, but oftentimes their families do not have any idea of their whereabout and become very anxious. Apart from a few unfortunate cases, most of these patients could be located after some time. But It takes a great deal of effort and resources to locate these patients in a reasonable time frame. In the process, their families and friends may endure a great deal of stress.

In principle, locating technologies known in the art, e.g., Global Positioning System (GPS) could be used to help locating the missing persons. GPS receivers can give a precise location fixed in a range of 10 meters if the patient is in an outdoor location where satellite signals can be easily received. However, satellite signals can be difficult, if not impossible, to receive in the over-populated metropolitan areas, such as Hong Kong, Tokyo, etc, because of the surrounding tall and dense buildings. The situation is even worse if the patient is staying indoors. Therefore there is a need for a tracking system to locate a person suffering from senile dementia within a room inside a building in an over populated city such as Hong Kong, where there are many hundreds of tall buildings and a typical building has 20 to 60 floors and each floor has 4 to 50 rooms.

SUMMARY OF THE INVENTION

Accordingly, an object of the prevent invention is to provide a personal tracking system and device for people suffering from senile dementia, mentally retarded persons and hyper active children, which is particularly useful in over-populated metropolitan area full of high rise buildings.

Another object of the prevent invention is to provide tracing system and device which consumes little battery power in standby mode so that it does not require frequent charge or change of batteries, making it particularly suitable for users who cannot look after themselves.

These and other objects of the present invention are realized by a wearable or portable device comprising three main modules each based on a different communication technology: (a) a GSM cellular mobile phone module, (b) a Global Positioning System (GPS) module, and (c) a Radio Directional Finding (RDF) module, where the GSM module can communicate with a control center and/or search team via SMS (or GPRS or other wireless communication protocol and technologies) by sending positioning or other information to the control center and/or the search team and at the same time receive control codes or commands from the control center and/or search team, whereby further controlling the GPS module and RDF module, such as turning them on and off and feeing the GPS module with initial positioning data based on the location of the GSM base station. In this way, the GPS and RDF modules are not required to stay on all the time and rather they are normally power off (or in a hibernated state or in a standby mode) until they are needed. When they are needed, each can be turned on by the control center/search team via the GSM module. Furthermore, the GSM module itself does not stay on all the time either and it is automatically turned on in a predetermined internal by an on-board timer within a microprocessor (CPU). The main advantage of this novel design is that the device uses little power and thus dose not require the use of rechargeable batteries, saving the trouble of frequent recharges.

Optionally, the tracking system and device may contain an ultrasonic beacon module, which can be advantageously used when the search target is behind a closed door inside a building for causing less disturbance to residents in rooms which do have the search target.

The various features of novelty which characterize the invention are pointed out with particularity in the claims annexed to and forming a part of this disclosure. For a better understanding of the invention, its operating advantages, and specific objects attained by its use, reference should be made to the drawings and the following description in which there are illustrated and described preferred embodiments of the invention.

BRIEF DESCRIPTION OF THE DRAWINGS

FIG. 1 shows the block diagram of the tracking device. The device consists of a switch, a GPS module, a GSM phone module, a radio beacon, an ultrasonic beacon and a CPU.

DETAILED DESCRIPTION OF PARTICULAR EMBODIMENTS OF THE INVENTION

The tracking system and device according to the present invention consists of a wearable or portable device which makes use of three types of locating technologies, namely, Global Positioning System (GPS), Cellular Mobile Phone Position Services, and Radio Directional Finding (RDF). A typical tracking device according the present invention is incorporated with a GPS receiver module, a cellular mobile phone module, and a radio beacon module in the wearable or portable device. Optionally, it may also contain an additional ultrasonic bidirectional module. The various modules in the tracking device, as a person having ordinary skill in the art would understand, are usually coordinated and controlled by an on-board microprocessor (that is, a central processing unit or CPU). The hardware and software implementation of such coordination and control between the modules is conventional and can be accomplished by artisans with ordinary skill in the art.

FIG. 1 depicts diagrammatically a non-limiting, exemplary embodiment of the present invention. As shown there, the device comprises a switch, a GPS module, a GSM phone module, a radio beacon, an ultrasonic beacon and a CPU.

In this particular embodiment, the device is powered by two batteries. They are shown as Battery 1 and Battery 2 in FIG. 1. Battery 1 (primary power supplier) has a larger capacity and it is the actual power source of the tracking device and Battery 2 (secondary power supplier) needs a smaller capacity and thus can be a small button battery. Battery 2 is used for powering the timer inside the CPU when the CPU is in sleep mode. GPS Module is connected to the CPU by RS232 serial bus at TTL level, i.e., GPS statements (position data) are transmitted from the GPS module to CPU. GSM Phone Module is connected to the CPU by RS232 serial bus at TTL level, i.e., the GSM Phone Module is under the control of the CPU. The CPU sends and receives SMS messages using this interface. Radio Beacon is connected to the CPU by a serial bus. The CPU controls the Phase Locked Loop frequency synthesizer in the radio beacon via the serial bus, i.e., the channel frequency of the radio beacon is selected by the CPU.

The serial bus connections used in connecting various modules in the above described particularly embodied device, of course, can be replaced by other connection types as seen fit by artisans ordinarily skilled in the field without departure from the spirit of the present invention.

The power supplies of all modules, i.e., GPS Module, GSM Phone Module, Radio Beacon and Ultrasonic Beacon are connected to Battery 1 and under the control of CPU, i.e., the CPU can turn on or off each module individually using program logic. The follow describes in detail the operation process using this exemplary device.

Under standby condition, all modules are power off except the timer program inside the CPU which is under sleep mode. Battery 2 (secondary power supplier) supplies the current of the CPU which is extremely small, in the order of micro ampere. The timer can be reset to zero by pressing the switch shown in the block diagram. If the timer has not been reset and it increments until it reaches a preset value, then the system enters into its operation mode. Before the device entering the operation mode, there is no consumption on Battery 1 (primary power supplier). In other words, if nobody cares about the tracking unit, it will eventually enter into its operation mode. However, if there is someone who presses the switch from time to time before the preset value of the timer, the tracking device stays in standby mode. The preset value of timer can be changed easily to suit the nature of the application, e.g., the condition of the patient.

In the operation mode, CPU is returned to its kernel program and it starts the operation in the following sequence:

(a) It powers on the GSM phone module and sends an SMS message, in a predetermined format, to the control center which informs the center that the tracking device is in operation.

(b) Once the GSM phone module has been turned on, the center can locate the position of the tracking device by subscribing a phone locating service available from its phone service provider. The principle of the phone locating service is based on the fact that each mobile phone once turned on is required to register to a base station which has a location known by the service provider. Therefore the accuracy of the position depends on the coverage of the base station which is usually in the order of 100 m to 1 km. It provide good coverage in city streets where accuracy is in the range between 50 and 500 meters.

(c) The center can turn on the GPS module by sending SMS message, in a special design format, to the tracking device. Once the GPS module has been turned on, the condition of the received satellite signals and the current positional data are sent from the tracking device back to the control center via SMS messages. If the received satellite signals are good, say an outdoors condition, the positional data can indicate the position of the tracking device within an error of 10 meters. If the received satellite signals are poor, e.g., the tracking device is indoors, the center can turn off the GPS module for prolonging battery lifetime.

(d) If the tracking device is indoors, the center can know roughly where it is by using the phone locating service. Therefore the center can send a searching team to that location and turn on the Radio Beacon such that the searching team can use Radio Direction Finding technique to locate the exact position of the tracking device.

(e) If the tracking device is inside a building and behind a closed door, in fact the searching team usually can identify which floor or floors it belongs to using Radio Direction Finding technique but it is hard to locate which room. It may be disturbing to knock all the doors in a floor, therefore the center can turn on the Ultrasonic Beacon using SMS message such that the searching team can use an ultrasonic detector to locate the room by detecting the ultrasonic signal leaking from the edge of the door.

GPS is a satellite based locating technology and it is the most popular technology used for navigation of cars today. It has a global coverage and positioning accuracy of 10 meters. It works excellently in open sky area where there is a direct path between the satellites and the satellite receivers such that the satellite signals are received without multi-path reflections. However in over populated inner city areas, multi-path reflections impose significant problems for the GPS system and can introduce locating error. For example, in Hong Kong, there is very limited satellite coverage in urban streets and it is even worse in indoor condition. The present invention solves this problem which is inherent in the GPS technology and turn GPS, a navigation technology in nature, into a part of the personal tracking system and device, which the GPS technology is complemented by other locating technologies. Specifically, a wireless link is put in connection with the GPS module, by which GPS locating information of the device carried on the missing person can be sent to the search team. This takes advantage of the fact that GPS is very useful for the initial seeking phase for a rough estimation of the location. Particularly, when the target is outdoors, the tracking can be finished in a very short time.

On the other hand, GSM cellular mobile phone networks usually have a very good coverage in city streets. In principle, each mobile phone is connected to a base station when it is on and the base station has coverage of 50 to 500 meters in urban area. Therefore cellular mobile phone network service providers can have the position information of the phone users all the time because they know where their base stations are. Our tracking system subscribes to locating services provided by cellular mobile phone network providers. In countryside, the coverage of base stations is larger, up to a few kilometers, but GPS could be used in this situation. As mentioned in the foregoing, the GSM phone module in our wearable device provides the wireless link for the GPS and it is used for initial seek in urban area. In the wearable device according to the present invention, there is an (Radio frequency) RF beacon which can be remotely turned on and changed channel frequency by an SMS messages via the GSM mobile phone module.

Once the RF beacon has been turned on, the person wearing the device can be tracked with radio directional finding techniques. A team of seekers carrying directional antenna and receivers will be deployed to locate the person in a range of ten of meters. This method works well even in indoor and underground conditions provided that the seekers are trained to avoid false signals from reflections.

In the device, everything is off, i.e., all electronic modules are under hibernation without consuming any energy from the installed main batteries and the GSM phone module turns on automatically until a timer elapses in a preset time duration, i.e., unlike a normal mobile phone, there is no need for the tracking device to recharge the battery periodically. The preset time duration can be easily adjusted according to the activities of the user. For example, in day time, it can be a few hours if the user is indoors or ten of minutes if the user is on the street accompanied by caring personnel. In addition, the timer can be easily reset to begin its count from zero by a caring person manually and this indicates that the patient is still within the reach of the caring person in the preset time duration. All other modules, i.e., GPS receiver module, and RF beacon are under the control of the phone module via SMS messages such that their power consumption can be kept at minimal. When the device is out of reach of satellite signals when it is indoors, there is no point to turning on the GPS receiver module, which can then be turned off. The timer consumes little power and runs on a secondary lithium battery, say a CR2032 battery, which can last more than a year without replacement. Once the wearable device is activated from hibernation, it can operate up to 52 hours under 4 AA alkaline batteries in an exemplary device according to the present invention.

Two rounds of field tests were conducted with a prototype of the tracking device according to the present invention. All the tests were conducted with a pseudo subject and the searching team had no prior knowledge of the position of the subject.

The first round of field tests was based on the version of the prototype device which was not really wearable but transportable. There are all together 17 tests in the first round which encompassed 2 outdoors (open sky), 5 outdoors (stationary), 5 outdoors (in motion) and 5 indoors situations. The subject was located successfully in all tests. The average time of seek was half an hour for all outdoors cases and three hours for all indoors cases. The longest seek time was 6 hours 35 minutes of an indoors case.

The second round of field tests was based on wearable version of the prototype. There were all together 6 tests in the second round which encompassed 2 outdoors (open sky), 2 outdoors (in motion), and 2 indoors situations. The subject was located successfully in all tests. The time of seek was within one hour for all cases. The size of the wearable device was 140 mm×75 mm×30 mm and it weighed 275 g with 4 AA batteries.

The communication method and technology between the center/search team and the tracking device is preferably based on a GSM phone module, as it was used in the above embodiments. However, a GSM phone module may be replaced with a radio transceiver which can be used to establish the data and control channel. There is a number of factors needed to be taken into consideration when taking the radio transceiver approach. For example, it requires a dedicate channel frequency and higher power consumption if the required coverage is large.

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims.

What is claimed is:

1. A portable tracking device, comprising
   (a) a wireless communication module;
   (b) a GPS module;
   (c) a radio beacon; and
   (d) at least a primary power supplier and a secondary power supplier;
   wherein said portable tracking device is either in a standby mode in which said GPS module, wireless communication module, and radio beacon consume substantially no energy or in an operation mode which entails substantially more energy consumption and said wireless communication module, said GPS module and said radio beacon are in connection with a microprocessor having a timer which turns on said tracking device from said standby mode to said operation mode in a predetermined time interval; wherein said portable tracking device has a first operation configuration and a second operation configuration; wherein when in said first operation configuration said wireless communication module, said GPS module and said radio beacon are in connection to and powered by neither said primary power supplier nor said secondary power supplier and when in said second operation configuration said wireless communication module, said GPS module and said radio beacon are in connection to and powered by said primary power supplier either simultaneously or at different times; and wherein said timer is in connection to and powered by said secondary power supplier and is configured to trigger a change of said portable tracking device from said first operation configuration to said second operation configuration in a predetermined time interval.

2. The portable tracking device of claim 1, further comprising an ultrasonic beacon.

3. The portable tracking device of claim 1, wherein said wireless communication module is a phone module.

4. The portable tracking device of claim 3, wherein said wireless communication module is a GSM or 3G phone module.

5. The portable tracking device of claim 1, wherein said wireless communication module is a radio transceiver module.

6. The portable tracking device of claim 1, wherein said primary power supplier is rechargeable or non-rechargeable battery.

7. The portable tracking device of claim 3, wherein said phone module and said GPS module are each connected to said microprocessor by a RS232 serial bus.

8. The portable tracking device of claim 2, wherein said radio beacon and said ultrasonic beacon are each connected to said microprocessor by a serial bus.

9. The portable tracking device of claim 2, wherein said phone module, said GPS module, said radio beacon and said ultrasonic beacon are each configured to be capable of being turned on or off independently by said microprocessor.

10. A process of tracking a person who cannot communicate his or her location to others, comprising the steps of:
    (a) associating said person with a portable tracking device within which there is a GPS module, a wireless phone module, a radio beacon, a timer within a microprocessor, a primary power supplier and an optional secondary power supplier;
    (b) presetting said timer to trigger activation of said device from a standby mode in which said GPS module, wireless phone module, and radio beacon consume no energy into an operation mode in which said wireless phone module is turned on and powered by said primary power supplier;
(c) informing a remote center by said wireless communication module that said tracking device is in operation;
(d) obtaining information about the location of said tracking device from a phone service provider;
(e) turning on said GPS module and determining an area where said person associated with said portable tracking device is located if GPS signal is good;
(f) turning on said raid beacon to guide a search team to an areas where said person associated with said portable tracking device is located if GPS signal is poor.

11. The process of tracking according to claim 10, wherein said portable tracking device further comprises an ultrasonic beacon.

12. The process of tracking according to claim 11, further comprising a step of
(g) turning on said ultrasonic beacon when said person associated with said portable tracking device is behind a closed door.

13. The process of tracking according to claim 10, wherein said remote center communicate with said wireless phone module in said portable tracking device using a GSM or 3G network.

14. The process of tracking according to claim 13, wherein said remote center communicate with said wireless phone module in said portable tracking device by an SMS message or GPRS data pack.

* * * * *